POWER CONTROL CIRCUITS

Filed Feb. 7, 1964

INVENTOR.
E. KEITH HOWELL
BY Melvin M. Goldenberg
ATTORNEY

United States Patent Office 3,346,874
Patented Oct. 10, 1967

3,346,874
POWER CONTROL CIRCUITS
Edward Keith Howell, Skaneateles, N.Y., assignor to General Electric Company, a corporation of New York
Filed Feb. 7, 1964, Ser. No. 343,372
12 Claims. (Cl. 307—88.5)

Figure 1A:
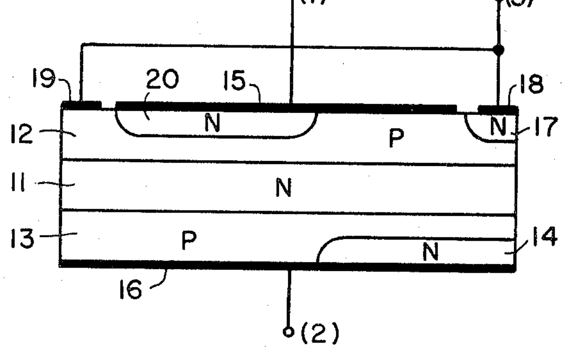

This invention relates to circuitry for the selective supply of power to a load. More particularly, the invention relates to the use of bi-directional current conducting semiconductor devices for controlling the amount of alternating current power delivered to a load.

The continuously expanding use of electrical energy has resulted in the concentration of a great deal of design effort upon circuitry for suitably supplying power to a wide variety of load circuits. In many applications, stringent requirements are set with respect to the available space for the circuitry, the operating environment within which it must function, the sensitivity with which it accomplishes desired operations, the cost of the components employed, and the reliability with which it functions.

An object of the present invention is to provide improved power control circuitry exhibiting the characteristics of low cost, minimal size, and high reliability and sensitivity.

The development of semiconductor devices has provided extremely useful circuit elements for use in attaining the broad objectives of the present invention. Recently, for example, the silicon controlled rectifier has been found to be particularly useful. These devices are basically three terminal semiconductor rectifiers operative to switch from a high to a low impedance between two main terminals in response to a relatively short impulse on a gate terminal. In order to control the supply of alternating current power, two such devices, connected with opposing orientations, are generally interposed between the supply and a load. Control circuitry is used to selectively deliver independent triggering pulses to each device in accordance with a desired operating scheme. To reduce the cost and complexity of such arrangements, one controlled rectifier may be eliminated by using a bridge circuit wherein four conventional rectifiers provide the bridge and a single controlled rectifier is connected across its output. Even though this technique reduces the required number of controlled rectifiers, and perhaps the complexity of the triggering circuitry, it does so at the expense of added conventional rectifiers.

The invention of controlled bi-directional current conducting semiconductors has provided the answer to the need for simple circuitry for controlling the delivery of alternating current power. These semiconductors normally exhibit a high impedance between two main current carrying terminals. When a relatively low power triggering impulse is applied to a third or gate terminal, the devices switch to a second state wherein a low impedance exists between the current carrying terminals. Such semiconductors are bilateral in nature and permit current condition in either direction with equal facility. Furthermore, the triggering impulses required to effect switching from a high to a low impedance state may generally be of either polarity. Obviously, the bilateral characteristic of the main current conducting path and the flexibility offered by the permissible forms of triggering impulses render bi-directional current conducting semiconductors admirably suited for control of alternating current.

In the utilization of controlled impedance devices such as bi-directional current carrying semiconductors, the amount of power delivered to a load is generally selectively applied either through such a device or in parallel therewith. The power delivered to the load is consequently determined by the conduction intervals of the controlled device. Given this general circuit configuration, it becomes important to determine the manner in which the devices are controlled. What is effectively pulse width modulated power can be delivered to such interconnected loads by selectively triggering the controlled device to a low impedance state for periods bearing a discrete relationship to the particular amount of power to be applied. The circuitry which generates the triggering impulse must operate with precision in that its stimulation of the controlled device directly determines the amount of power delivered. Such circuitry should be designed with the specific characteristics of the controlled device in mind in order to optimally utilize its characteristics. Accordingly, with devices such as controlled bilateral semiconductors, the control circuitry should deliver low power, sharply rising triggering signals. For control over a full wave of alternating current, the triggering signals should recur at half cycle intervals with phase positioning in reference to the alternating current supply that can be discretely controlled in accordance with desired operating conditions.

Another object of the present invention is to provide power control circuits using bi-directional current conducting semiconductors which are controlled by phase controlled triggering signals.

Still another object of the present invention is to provide means for generating phase controlled triggering signals for bi-directional current conducting semiconductors having a controllable range of operation affording a substantially one hundred percent duty cycle of semiconductor operation.

As described hereinafter in conjunction with several illustrative embodiments, the invention basically comprises unique control signal generating circuits in combination with a bi-directional current conducting semiconductor. The embodiments illustrate means for generating phase controlled triggering signals having opposite polarities on successive half cycles of the supply voltage. These means specifically include double time constant circuitry and ramp-and-pedestal circuitry adapted to selectively attain a predetermined signal amplitude at desired instants in each half cycle of supply voltage application.

Figure 1B:
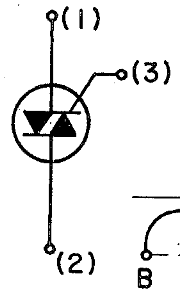
Figure 1C:
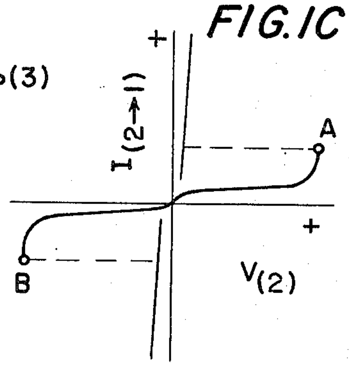
Figures 2A, 2B:
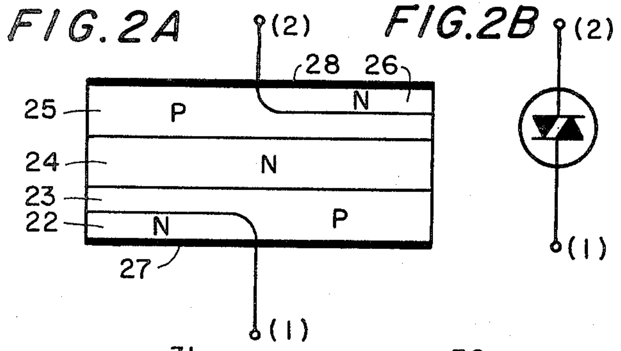
Figure 2C:
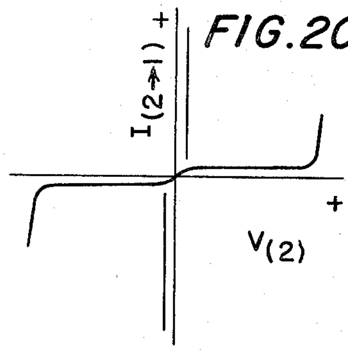
Figure 3:
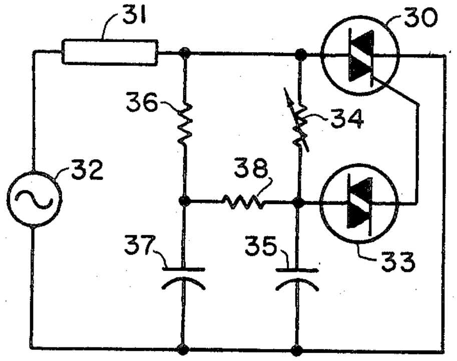
Figure 4:
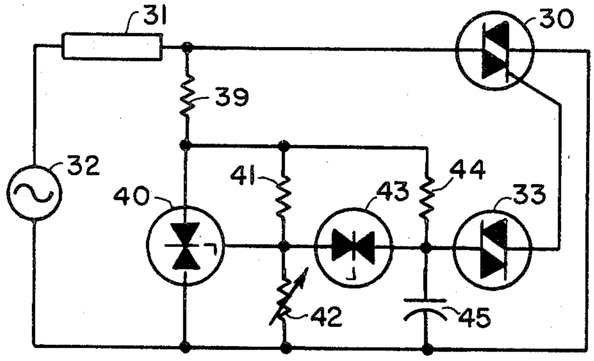

The invention is set forth with particularity in the appended claims. The organization and method of operation of the invention together with further objects and features thereof, may best be understood by reference to the following description taken in conjunction with the accompanying drawings wherein:

FIGS. 1A, 1B, and 1C illustrate respectively: a diagrammatic representation of one form of controlled bi-directional current conducting semiconductor; a symbolic representation for such a device; and typical characteristic operating curves for such device;

FIGS. 2A, 2B, and 2C illustrate respectively: a diagrammatic representation of a bi-directional current conducting semiconductor device switchable to a low impedance state when the voltage across its two sole terminals exceeds a predetermined magnitude; a symbolic representation for such a device; and typical characteristic operating curves of such a device;

FIG. 3 is a circuit schematic illustrating an embodiment of the invention wherein phase control over a controlled bi-directional current conducting semiconductor is obtained by means of a double-time-constant triggering circuit; and FIG. 4 is a circuit schematic illustrating an embodiment of the invention wherein a ramp-and-pedestal phase controlled circuit is employed to develop phase controlled signals for triggering a controlled bi-directional current conducting semiconductor.

*Controlled bi-directional current conducting semiconductors*

A general understanding of controlled bi-directional current conducting semiconductors (hereafter referred to as controlled bilateral devices) is required in order to understand and appreciate the invention as embodied in the illustrative circuits described hereinafter. Broadly speaking, these three-terminal devices can be constructed to furnish four modes of operation. The modes of operation differ in the direction of current flow between the main current conduction carrying terminals of the device and in the required direction of current flow into the trigger terminal of the device in order to make it switch from a high to a low impedance state. If the device is arbitrarily designated, as shown in FIG. 1B, to have main current carrying terminals (1) and (2) and a gate terminal (3), the following table represents the four possible modes of operation. In the table, $V_{(2)}$ is considered positive if terminal (2) is more positive than terminal (1), and $I_{(3)}$ is considered positive if current flows into gate terminal (3).

| Mode | $V_{(2)}$ | $I_{(3)}$ (for turn on) |
|---|---|---|
| 1 | + | + |
| 2 | − | − |
| 3 | + | − |
| 4 | − | + |

An examination of the above table makes it apparent that the devices may be switched to their low impedance state in either direction of conduction by triggering impulses of either polarity. Although each device may not be capable of operation in all four modes, the devices may be selectively constructed in order to furnish operation in any modes that are desired. Thus, for example, if it is wished to provide a device operative in the second and third mode, current conduction in either direction through the device may be triggered by impulses having a negative polarity only. On the other hand, if it is desired to operate in the first and second mode, triggering impulses having a polarity similar to that of the direction of conduction (as defined by the symbols used in the table) will be required.

One example of a typical controlled bi-directional current carrying semiconductor is shown in FIG. 1A. This particular structure has been shown and described in detail in the co-pending patent application of F. W. Gutzwiller, Ser. No. 331,776, filed Dec. 19, 1963, now Patent No. 3,275,990, and assigned to the General Electric Company, assignee of the present invention. This device is designed to function primarily in the modes 1 and 2 set forth in the above table. Accordingly, when current carrying terminal (2) is positive with respect to current carrying terminal (1), the device is switchable to a low impedance state by supplying a current into gate terminal (3). When the reverse polarity is applied between the main terminals (1) and (2) the device is switchable to a low impedance state by extracting current from gate terminal (3). Stated another way, conduction from terminal (2) to terminal (1) may be initiated by the application of a positive signal to terminal (3) and conduction from terminal (1) to terminal (2) may be initiated by the application of a negative signal to terminal (3). Such a unitary structure may be described as a monolithic PNPN junction type semiconductor switching device and is described in greater detail in the afore-mentioned application Ser. No. 331,776 of F. W. Gutzwiller. This bilateral controllable semiconductor switching device comprises a body of semiconductor material including five layers of one and the opposite conductivity types, layers of one conductivity type being interleaved with layers of the opposite conductivity type forming a plurality of p-n junctions therein. A first main current carrying electrode is provided in low resistance ohmic contact with a surface of an external layer of said body and an exposed surface of an adjacent intermediate layer. A second main current carrying electrode is provided in low resistance ohmic contact with a surface of the other external layer of said body and an exposed surface of an adjacent intermediate layer. A gate region is provided of the same conductivity type as said external layers of said body adjacent said intermediate layers contacted by the said first main current carrying electrode. The gating electrode is provided in ohmic contact with said gate region and with the adjacent intermediate layer to provide for switching the semiconductor device between high and low impedance states for current through said device in opposite senses.

The device of FIG. 1A is a multi-layer device having an internal layer 11 of n conductivity type sandwiched by p conductivity type layers 12 and 13. An n conductivity region 14 is formed adjacent or contiguous with an external portion of p layer 13 and an n conductivity type region 20 is formed adjacent or contiguous with an external portion of p layer 12. The n region 20 is only contiguous with a part of p region 12 and is spaced from the sides of the device to leave exposed surfaces of p region 12 on both lateral sides thereof. Electrical contacts for the main current conduction path through the device are provided by low resistance contacts 15 and 16 on the major faces thereof. Electrode 15 contacts the external n region 20 and the exposed portion of the next adjacent p layer 12, and consequently shorts the p-n junction therebetween. Electrode 16 extends over external n layer 14 and the exposed portion of p layer 13 shorting the p-n junction therebetween. As shown in the figure, electrodes 15 and 16 define terminals (2) and (1) of the device respectively.

It may be helpful to note that the device as thus far described constitutes a five-layer semiconductor with shorted emitters and is essentially the five layer, two terminal bilateral switch described in the co-pending patent application of Holonyak et al., Ser. No. 838,504, filed Sept. 8, 1959, and assigned to the General Electric Company, assignee of the present invention. This latter device is shown in FIG. 2 and described hereinafter.

In order to establish control over the conduction between terminals (1) and (2) of the device in FIG. 1A, two gate connections are provided. First, an n conductivity type region 17 is established on an external portion of p layer 12 near electrode 15. A low resistance contact 18 is formed on this gate region and gate terminal (3) is connected thereto. Another contact is established with p layer 12 at a point electrically remote from the junction between layers 17 and 12. This second contact is accomplished with electrode 19 which is also connected to terminal (3).

A general understanding of the operation of the controlled bilateral device shown in FIG. 1A will be available if one considers the device as being made up of two portions: the first portion comprising, electrodes 15 and 19, n layer 20, p layer 12, n layer 11, p layer 13, and electrode 16; and the second comprising, electrodes 15 and 18, n layer 17, p layer 12, n layer 11, p layer 13, n layer 14, and electrode 16. With this hypothetical division of the device it will be appreciated that the first portion represents a standard type silicon controlled rectifier and its functioning may be considered to be analogous to such a device. The second portion represents a remote gate silicon controlled rectifier and its functioning may be considered to be analogous to such a device. The operation and functioning of silicon controlled rectifiers is fully set out in numerous publications including the General Electric Controlled Rectifier Manual, second edition, copyright 1961, by the General Electric Company. The operation and functioning of the remote gate silicon controlled rectifier is fully described and illustrated in the co-pending patent application of F. E. Gentry et al., Ser. No. 326,162, filed Nov. 26, 1963, now Patent No. 3,284,680, and assigned to the General Electric Company, assignee of the present invention.

The operation of the device will be briefly considered in conjunction with the typical characteristic curves shown in FIG. 1C. In these curves current flow through terminals (1) and (2) is plotted as ordinates with flow from (2) to (1) being considered positive, and the instantaneous voltage on terminal (2) is plotted as abscissae.

When terminal (2) is positive relative to terminal (1) the two outer layers of the device in FIG. 1A tend to conduct because the p-n junction between layers 13 and 11 and the p-n junction between layers 12 and 20 are forward biased. On the other hand, the center n-p junction between layers 11 and 12 tends to block current flow through the device. This blocking condition may be removed by either raising the total voltage across the junction to a sufficiently high value to force conduction, or by introducing a sufficient amount of current through the gate terminal (3) and electrode 19 to cause a change in the charge condition across the junction. In operation, this is effectively what is done. Without going into a detailed recitation of the distribution and redistribution of electrons and holes wthin the device, it suffices to say that when sufficient gate current is supplied thereto the space charge at the blocking n-p junction between layers 11 and 12 collapses and within a short while, the device presents a low impedance path for current flow from terminal (2) to terminal (1).

This condition is illustrated in the first quadrant of the characteristic curves of FIG. 1C. Thus, when the voltage on terminal (2) is positive, an increase in the voltage does not cause an increased current until "breakover voltage" and "breakover current" is attained at point A and avalanche multiplication begins. Beyond this point, the current increases rapidly until the center junction between layers 11 and 12 becomes forward-biased. At this time the device goes into a high conduction state. For increasing magnitudes of gate current into terminal (3), the region of the characteristic between the breakover voltage and the conduction voltage is narrowed as the magnitude of the breakover voltage is reduced.

When the voltage on terminal (1) is positive with respect to the voltage on terminal (2) the device in FIG. 1A operates in a somewhat different fashion but is again responsive to a gating impulse on terminal (3) to assume a high conduction state. This polarity on terminals (1) and (2) tends to make the respective p-n junctions between layers 12 and 11 and layers 13 and 14, conductive. However, the n-p junction between layers 11 and 13 tends to block current flow through the device. Once again, it will be apprecitaed that in order to ovrecome this blocking condition it is necessary to either raise the voltage across the junction to a high enough value to force conduction thereacross or to extract current from gate terminal (3) in order to change the charge condition appearing at this junction.

The characteristic curve shown in the third quadrant of FIG. 1C illustrates device operation under the last mentioned condition. It will be seen that increasing the voltage between terminals (2) and (1) has little effect until the breakover voltage occurs at point B. After this, the current begins to increase and holes and electrons are redistributed within the various layers of the device until the device switches completely into high conduction.

The brief description hereinabove shows that the controlled bilateral device in FIG. 1A exhibits bi-directional current conducting characteristics and is operative under the control of appropriate polarity triggering impulses on terminal (3) to selectively furnish a low impedance path between terminals (1) and (2). A more detailed explanation of the functioning of such a device is available in the aforecited patent application of F. W. Gutzwiller, Ser. No. 331,776, filed Dec. 19, 1963.

*Two-terminal bi-directional current conducting semiconductor*

The diagram of FIG. 2A illustrates a bilateral semiconductor which is designed to conduct current in either direction when the applied voltage in the desired direction exceeds a predetermined amount. A detailed discussion and description of this device is available in the copending patent application of N. Holonyak et al., Ser. No. 838,504, filed Sept. 8, 1959, and assigned to the General Electric Company, assignee of the present invention. It is also described in an article entitled "Two-Terminal Asymmetrical and Symmetrical Silicon Negative Resistance Switches," by R. W. Aldrich and N. Holonyak, Jr., in the Journal of Applied Physics, volume 30, number 11, pages 819 through 824, November 1959.

In view of the previous discussion of controlled bilateral devices in conjunction with FIG. 1, the operation of the semiconductor device in FIG. 2 will be apparent. This is a bilateral device that switches to a low impedance state whenever the voltage across its two terminals exceeds a predetermined threshold value. The typical characteristic curves in FIG. 2C visually illustrate such operation. As distinguished from the controlled bilateral semiconductors typified by the device in FIG. 1, the FIG. 2 devices cannot be controlled with independent triggering signals. From an operational aspect, if terminal (1) is made positive with respect to terminal (2), the p-n junctions between layers 23 and 24 and layers 25 and 26 are forward biased and, therefore, tend to conduct; however, the n-p junction between layers 24 and 25 is in a blocking state. This blocking state is overcome only when the applied potential attains a predetermined threshold magnitude. Once this magnitude is attained, an avalanche condition develops that switches the device into a high conduction state. Inasmuch as the device is symmetrical when viewed from either electrode, it will be appreciated that its operation is identical in response to either polarity of applied voltage.

The illustrative embodiments of the invention shown in FIGS. 3 and 4 each utilize controlled bilateral devices of the type shown in FIG. 1A and two-terminal bilateral devices of the type shown in FIG. 2. Nevertheless, it will be appreciated that similar types of two-terminal bilateral devices such as neon glow lamps, three-layer semiconductor trigger devices, etc., may be employed in place of the two-terminal device discussed immediately hereinabove.

*Power control circuits*

The circuit in FIG. 3 comprises an alternating current source 32 supplying a load 31 in a series circuit including a controlled bilateral semiconductor 30. A double-time-constant phase controlled triggering circuit supplies triggering signals via a two-terminal bilateral device 33 to semiconductor 30 at a preselected time following commencement of each half cycle of the alternating current from source 31. The phase controlled circuit comprises a pair of resistor-capacitor circuits linked by a resistor 38. The first of these resistor-capacitor circuits comprises a resistor 36 and capacitor 37 serially connected with load 31 across alternating current source 32. The second such circuit consists of an adjustable resistor 34 serially connected with a capacitor 35 and load 31 across supply 32. The junctions between the resistor and capacitor in each of these circuits are interconnected by resistor 38, and the junction between resistor 34 and capacitor 35 is further connected via the bilateral device 33 to the gate electrode of semiconductor 30.

During the operation of the circuit shown in FIG. 3, capacitor 35 accumulates charge via a charging path until sufficient voltage appears on its upper terminal to trigger the semiconductor 30. The threshold device, semiconductor 33, is interposed between timing capacitor 35 and the gate electrode of controlled semiconductor 30 in order to provide a well-shaped triggering impulse for sharper switching. It will be appreciated that with a simple resistor-capacitor circuit, the capacitor voltage approaches zero at 90° phase shift is approached. This is undesirable because it limits the range over which controlled bilateral device 30 can be phase controlled. With the circuit of FIG. 3, a more complete range may be attained because two separate timing circuits are combined to provide a double-time-constant phase control.

When it is desired to trigger device 30 within a short period of time after the initiation of each half cycle of the supply current from source 32, adjustable resistor 34 is set to a relatively small value with respect to resistor 36. Under these conditions, timing capacitor 35 is primarily charged from source 32 in the path comprising load 31 and adjustable resistor 34. Because adjustable resistor 34 is set at a small value, capacitor 35 is charged quite rapidly and consequently, attains the threshold voltage of triggering device 33 relatively early in the half cycle. When the threshold voltage of device 33 is attained, it assumes its low impedance state and capacitor 35 discharges into the gate electrode of controlled semiconductor 30, switching it to its low impedance state and initiating the application of full power to load 31.

When it is desired to trigger controlled semiconductor 30 at a time significantly later than the commencement of each half cycle of the supply current from source 32, adjustable resistor 34 is set to a relatively large magnitude with respect to resistor 36. Under these conditions, capacitor 37 is rapidly charged in the path comprising load 31 and resistor 36 in comparison with the charging of capacitor 35 in the path comprising load 31 and adjustable resistor 34. Accordingly, capacitor 35 receives charge from the capacitor 37 via coupling resistor 38. Obviously, if resistor 34 is quite large, capacitor 35 is effectively charged by a phase shifted signal from capacitor 37. Thus, the amplitude across capacitor 35 will be significant even 180° after the commencement of each half cycle.

It is seen that by utilizing the double-time-constant circuit shown in FIG. 3, phase shift control over a controlled semiconductor 30 may be provided wherein the triggering impulses supplied to the gate of device 30 may be selectively timed to occur at any period approaching 180° of the supply voltage. Furthermore, these control impulses are applied with opposite polarity on successive half cycles of the input supply.

It will be appreciated that many applications require a feedback arrangement wherein the load receives power in accordance with particular characteristics thereof or in accordance with some external condition. In FIG. 3 adjustable resistor 34 may be controlled to provide an impedance commensurate with a load condition, such as temperature, to automatically limit the power applied thereto. The circuit in FIG. 4 is designed to provide a high gain feedback control system which can also be made responsive to temperature, light, etc. In this circuit the load 31 is again supplied by an alternating current source 32 in series with a controlled bilateral device 30. A ramp-and-pedestal triggering arrangement is used therein to establish control signals occurring at instants of time with respect to the current from source 32 that is designed to effect desired operating conditions. The control circuit consists of means for generating a substantially rectangular waveform; means for selectively establishing a desired voltage level with this waveform; and means for increasing this selected level at a predetermined rate in order to attain the threshold voltage of a triggering device 33 for firing controlled semiconductor 30.

Considering the specific components used in FIG. 4 it will be seen that the rectangular waveform generator comprises a resistor 39 serially connected with a double anode Zener diode 40 and load 31 across source 32. As the voltage from source 32 reaches the breakover voltage of the Zener diode 40, it assumes a constant voltage state and the voltage appearing across its terminal will accordingly be substantially rectangular in form. A voltage divider comprising resistor 41 and adjustable resistor 42 are serially connected across the terminals of Zener diode 40. The junction between these resistors has a rectangular waveform of magnitude determined by the setting of variable resistor 42. Also shunting Zener diode 40 is a resistor 44 and a capacitor 45. A second double anode Zener diode 43 interconnects the junctions between resistors 41 and 42 and resistor 44 and capacitor 45. This latter junction is also connected via triggering device 33 to the gate of controlled semiconductor 30. The breakover voltage of Zener diode 40 is selected to be higher than the breakover voltage of triggering device 33 for reasons to be soon apparent. Furthermore, the breakover voltage of the double anode Zener diode 43 is selected to be lower than that of diode 40 and in the order of the desired ramp amplitude.

During a normal operating cycle, with the commencement of each half cycle, capacitor 45 is charged by the rectangular waveform across the terminals of Zener diode 40 via resistor 41 and Zener diode 43. The magnitude attained by the charge on capacitor 45 is determined by the setting of adjustable resistor 42 which forms the lower portion of the voltage divider across Zener diode 40. After the voltage across capacitor 45 has reached the pedestal determined by the setting of variable resistor 42, it continues charging via resistor 44 until the threshold voltage of triggering device 33 is attained. At this time device 33 switches and capacitor 45 discharges into the gate electrode of semiconductor 30. As previously described, upon application of this control signal to semiconductor 30, load 31 substantially receives full power from alternating current source 32 for the remainder of that half cycle.

The value at which adjustable resistor 42 is set determines the magnitude of the pedestal to which capacitor 45 charges. Accordingly, it determines the time required for capacitor 45 to attain the threshold voltage. Resistor 44 controls the slope of the ramp which is superimposed on top of this pedestal. By controlling resistor 42 automatically in accordance with the characteristics of load 31, a closed feedback loop is attained. Simple means of such control would include the use of a thermistor or photoconductor for either resistor 41 or 42.

Two illustrative embodiments of the invention have been described hereinabove. It will, of course, be understood that it is not wished to be limited to these specific embodiments since modifications may be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. A circuit for connection to a source of alternating current comprising in combination, a bi-directional current conducting semiconductor device, said device comprising a body of semiconductor material including five layers of one and the opposite conductivity types, layers of one conductivity type being interleaved with layers of the opposite conductivity type forming a plurality of p-n junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity as said external layers of said body adjacent said intermediate layer contacted by said first main current carrying electrode, and third electrode means in ohmic contact with said gate region and with the adjacent intermediate layer, normally exhibiting a high impedance between said two main current carrying electrodes thereof and exhibiting a low impedance therebetween in response to the application of a signal having an amplitude greater than a predetermined magnitude to said third electrode thereof, means for interconnecting a load with the two main current carrying electrodes of said semiconductor and a source of alternating current, phase shifting means supplied by said source of alternating current, means connecting the output of said phase shifting means between the third electrode of said semiconductor and one of said two main current carrying electrodes and operative to furnish a low impedance path therebetween in response to a signal from said phase shifting means having at least said predetermined magnitude, and additional means supplied by said source of alternating current and operative to modify the output of said phase shifting means.

2. A circuit as defined in claim 1 wherein said additional means comprises independent phase shifting means supplied by said source of alternating current.

3. A circuit as defined in claim 1 wherein said additional means comprises means connected to said source of alternating current and operative to supply a preselected amount of power to said phase shifting means.

4. A circuit for connection to a source of alternating current comprising in combination, a bi-directional current conducting semiconductor device, said device comprising a body of semiconductor material including five layers of one and the opposite conductivity types, layers of one conductivity type being interleaved with layers of the opposite conductivity type forming a plurality of p-n junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity as said external layers of said body adjacent said intermediate layer contacted by said first main current carrying electrode, and third electrode means in ohmic contact with said gate region and with the adjacent intermediate layer, normally exhibiting a high impedance between said two main current carrying electrodes thereof and exhibiting a low impedance therebetween in response to the application of a signal having an amplitude greater than a predetermined magnitude to said third electrode thereof, means for interconnecting a load with the two main current carrying electrodes of said semiconductor and a source of alternating current, energy storage means and impedance means serially connected across said two main current carrying electrodes, means connecting said energy storage means between said third electrode and one of said two main current carrying electrodes operative to furnish a low impedance path therebetween in response to at least a predetermined voltage level on said energy storage means, first and second independent charging paths for said energy storage means each operative at different charging rates.

5. A control circuit as defined in claim 4 wherein said first charging path includes said impedance means and said second charging path includes second energy storage means and second impedance means.

6. A circuit as defined in claim 4 wherein said first charging path includes means for selectively establishing a voltage level on said energy storage means, and said second charging path includes means for increasing said voltage level at a predetermined rate.

7. A circuit for connection to a source of alternating current comprising in combination, a bi-directional current conducting semiconductor normally exhibiting a high impedance between two terminals thereof and exhibiting a low impedance therebetween in response to the application of a signal having an amplitude greater than a predetermined magnitude to a third terminal thereof, means for interconnecting a load with the two terminals of said semiconductor and a source of alternating current, first energy storage means serially connected with first impedance means across said two terminals, second energy storage means serially connected with second impedance means across said two terminals, means interconnecting said first and second energy storage means, and means connecting said first energy storage means to the third terminal of said semiconductor and operative to furnish a low impedance path therebetween when the amplitude of the voltage on said first energy storage means at least exceeds said predetermined magnitude.

8. A circuit for connection to a source of alternating current comprising in combination, a bi-directional current conducting semiconductor normally exhibiting a high impedance between two terminals thereof and exhibiting a low impedance therebetween in response to the application of a signal having an amplitude greater than a predetermined magnitude to a third terminal thereof, means for interconnecting a load with the two terminals of said semiconductor and a source of alternating current, energy storage means, means connecting said energy storage means to said third terminal and operative to furnish a low impedance path therebetween in response to at least a predetermined voltage level on said energy storage means, a rectangular waveform generator supplied by said source of alternating current, first means interconnecting said generator and said energy storage means and operative to establish a preselected voltage level thereon, and second means interconnecting said generator and said energy storage means and operative to increase the magnitude of said preselected voltage level at a fixed rate.

9. A circuit for connection to a source of alternating current comprising in combination, a bi-directional current conducting semiconductor normally exhibiting a high impedance between two terminals thereof and exhibiting a low impedance therebetween in response to the application of a signal having an amplitude greater than a predetermined magnitude to a third terminal thereof, means for interconnecting a load with the two terminals of said semiconductor and a source of alternating current, energy storage means, means connecting said energy storage means to said third terminal and operative to furnish a low impedance path therebetween in response to at least a predetermined voltage level on said energy storage means, a rectangular waveform generator supplied by said source of alternating current, first charging means interconnecting said generator and said energy storage means and operative to supply charging current thereto until the voltage on said energy storage means attains a selected level, and second charging means interconnecting said generator and said energy storage means and operative to continuously supply charging current thereto.

10. A three terminal PNPN type semiconductor device, said device comprising a body of semiconductor material including five layers of one and the opposite conductivity types, layers of one conductivity type being interleaved with layers of the opposite conductivity type forming a plurality of p-n junctions therein, a first main current carrying electrode in low resistance ohmic contact with a surface of an external layer of said body and an exposed surface of an adjacent intermediate layer, a second main current carrying electrode in low resistance ohmic contact with a surface of the other external layer of said body and an exposed surface of the adjacent intermediate layer, a gate region of the same conductivity as said external layers of said body adjacent said intermediate layer contacted by said first main current carrying electrode, and third electrode means in ohmic contact with said gate region and with the adjacent intermediate layer, said device adapted to conduct current in one direction and in the opposite direction between said first and second main current carrying electrodes in response to a control signal applied between said third electrode and said first electrode, said device normally nonconductive in the absence of a control signal applied between said third electrode and said first electrode, a load circuit, a source of control signals, a current source, means for coupling said current source and said load circuit to said first and second main current carrying electrodes, means to apply a control signal from said control signal source between said third electrode and said first main current carrying electrode to cause conduction in said one direction during a predetermined portion of the time when the current from said current source is of positive polarity, and means to apply a control signal from said control signal source between said third electrode and said first main current carrying electrode to cause conduction in the opposite direction during a predetermined portion of the time when the current from said current source is of a negative polarity, said source of control signals comprising a first and second time constant circuit, means for changing the duration of said predetermined portions of time over a range of durations comprising, means for varying the relative degree of coupling of said first and second time constant circuits with said third and first electrodes.

11. An arrangement according to claim 10 further comprising a two terminal PNPN type semiconductor device adapted to conduct current in both directions between said two terminals for coupling said first and second time constant circuits between said third and first electrodes of said three semiconductor device.

12. A three terminal monolithic PNPN junction type semiconductor bi-directional current switching device having a first, second and third terminal, said device adapted to conduct current in one direction and in the opposite direction between said first and second terminals in response to a control signal applied between said third terminal and said first terminal, said device normally nonconductive in the absence of a control signal applied between said third terminal and said first terminal, a load circuit, a source of control signals, means for coupling said load circuit and said first and second terminals to an alternating current source, means to apply a control signal from said control signal source between said third terminal and said first terminal to cause conduction in said one direction during a predetermined portion of a positive polarity half cycle of said alternating current, means to apply a control signal from said control signal source between said third terminal and said first terminal to cause conduction in said opposite direction during a predetermined portion of a negative polarity half cycle of said alternating current, said source of control signals comprising a source of energy, an energy storage circuit, a two terminal PNPN type semiconductor device coupled to said energy storage circuit and adapted to conduct current in one direction between its two terminals in response to a positive polarity control signal applied across its two terminals and to conduct current in the opposite direction in response to a negative polarity control signal applied across its two terminals, means coupling said storage circuit and said two terminal semiconductor between said third and first terminals, means coupling said storage circuit to said energy source, and means for changing the time durations of said predetermined portions of said half cycles comprising means for changing the time constant of said storage circuit.

References Cited

UNITED STATES PATENTS

| | | | |
|---|---|---|---|
| 3,188,490 | 6/1965 | Hoff et al. | 307—88.5 |
| 3,196,329 | 7/1965 | Cook et al. | 307—88.5 X |
| 3,196,330 | 7/1965 | Moyson | 307—88.5 |
| 3,249,807 | 5/1966 | Nuckolls | 307—88.5 X |

FOREIGN PATENTS

| | | |
|---|---|---|
| 1,267,417 | 6/1961 | France. |

ARTHUR GAUSS, *Primary Examiner.*

B. P. DAVIS, *Assistant Examiner.*